Oct. 27, 1931.  G. LARSON  1,828,869
TILE SHAPING AND TRIMMING MACHINE
Filed Dec. 22, 1930   4 Sheets-Sheet 1
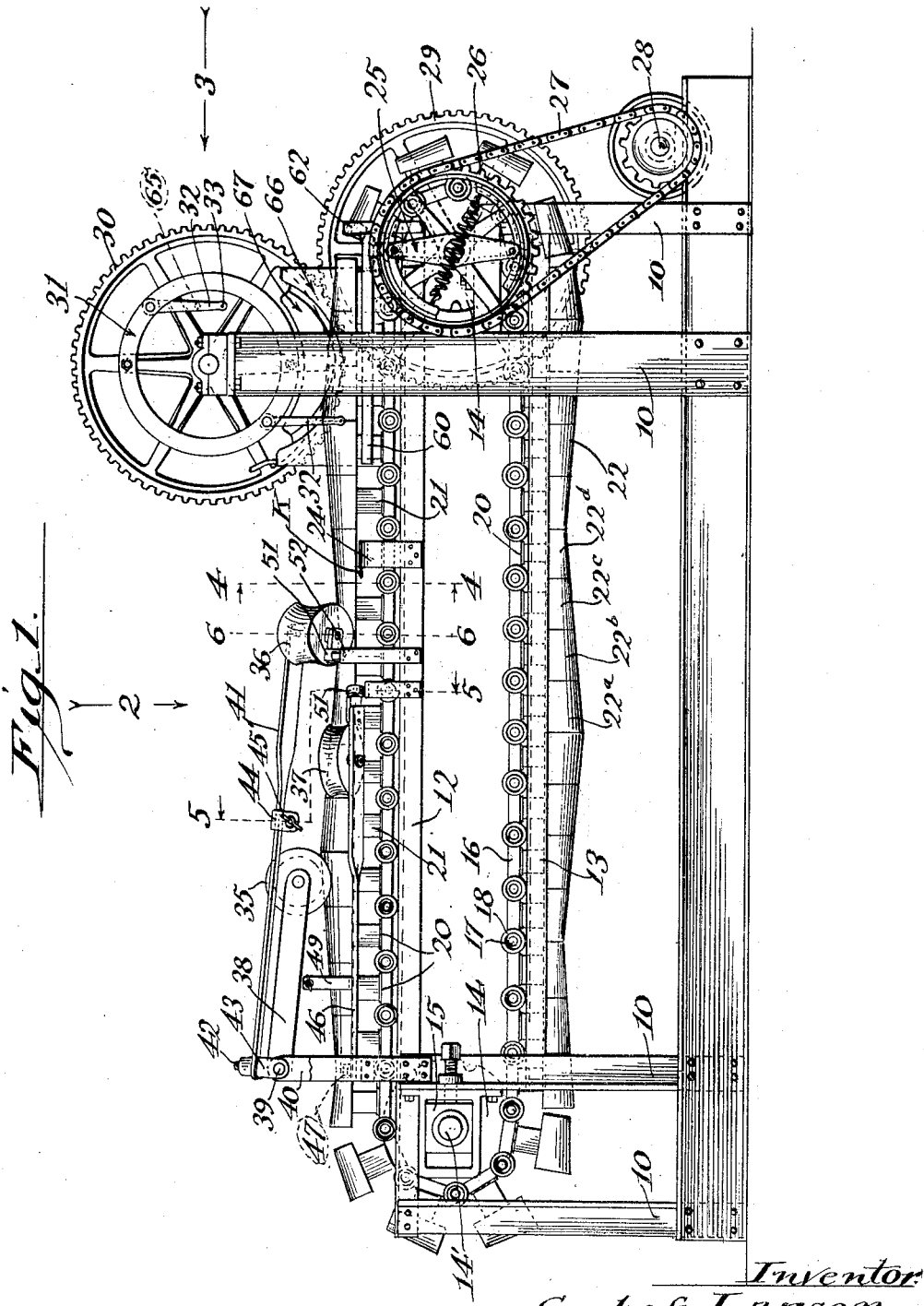
Inventor
Gustaf Larson.
Edmund A. Strauss
Attorney.

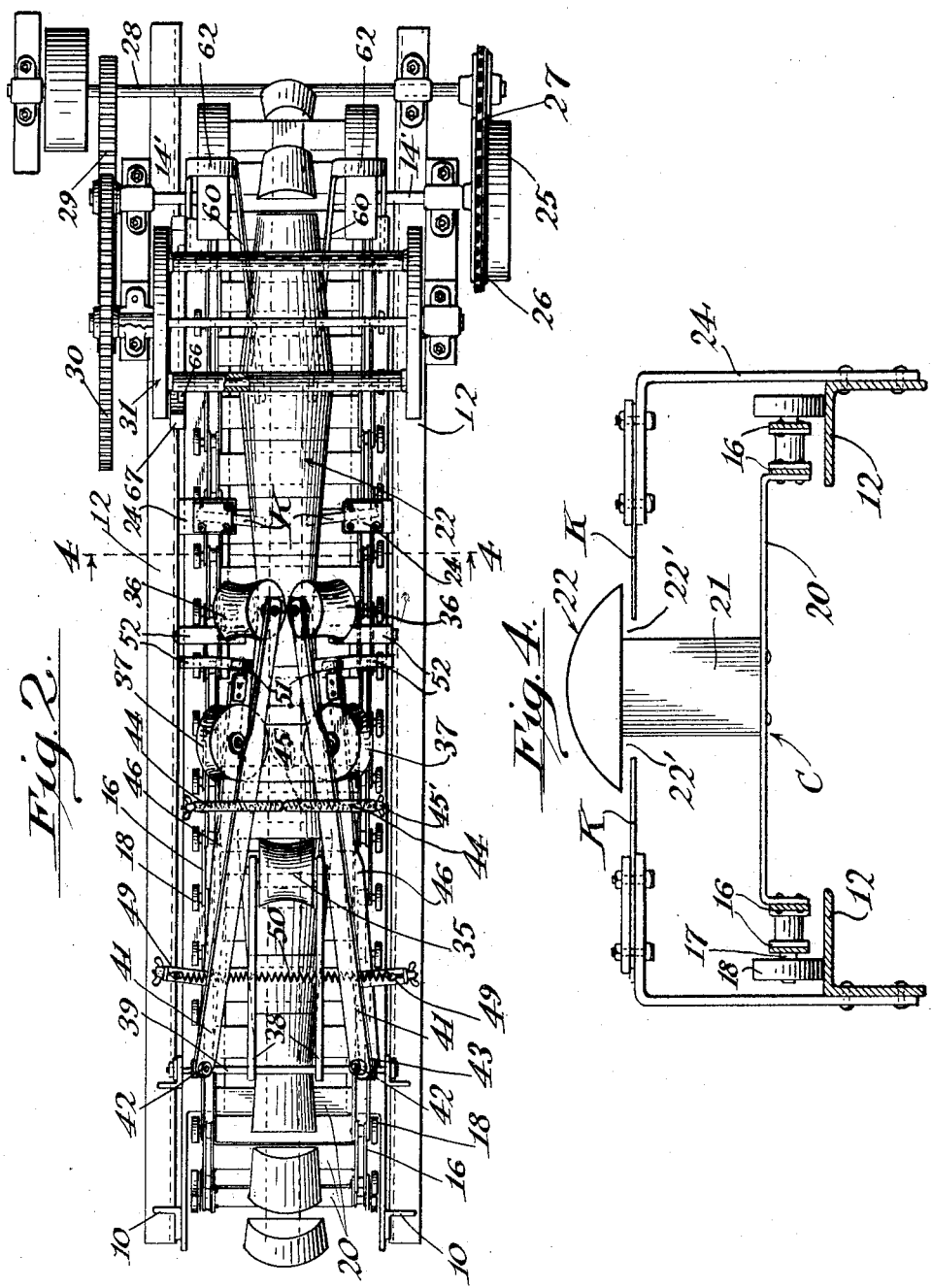

Oct. 27, 1931.  G. LARSON  1,828,869
TILE SHAPING AND TRIMMING MACHINE
Filed Dec. 22, 1930   4 Sheets-Sheet 3
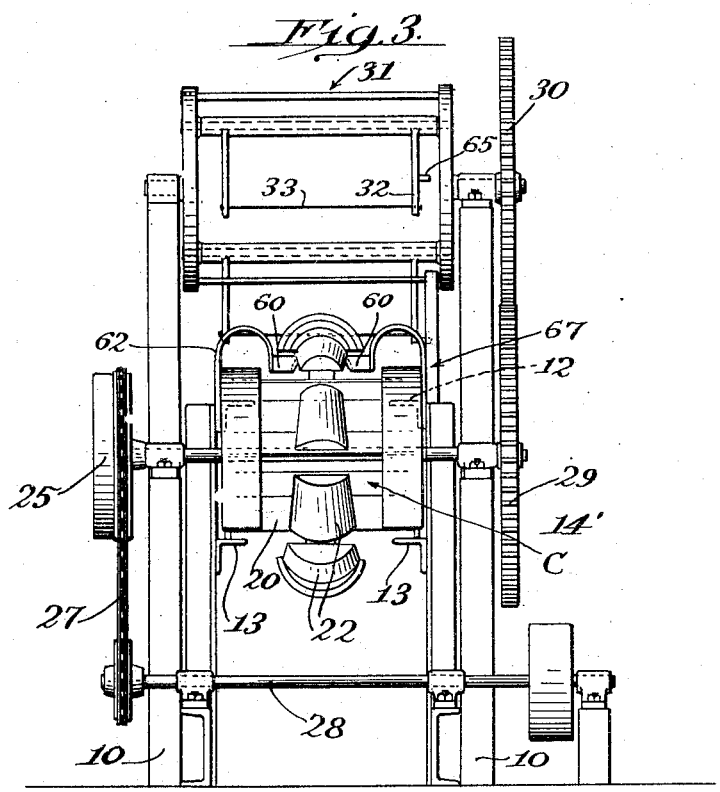
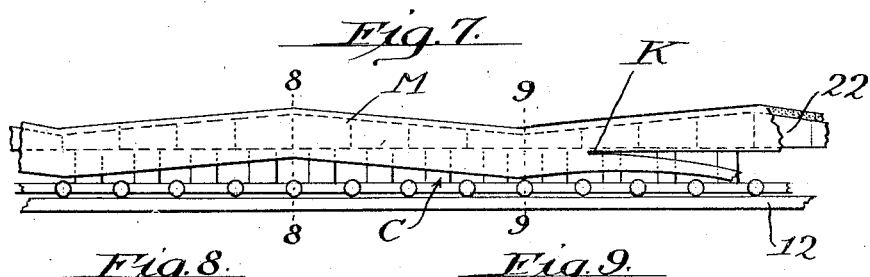
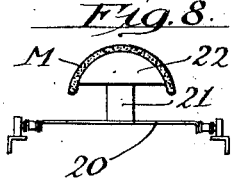
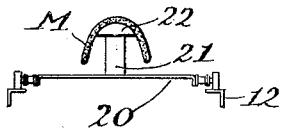
Inventor:
Gustaf Larson
Attorney Oct. 27, 1931.  G. LARSON  1,828,869
TILE SHAPING AND TRIMMING MACHINE
Filed Dec. 22, 1930   4 Sheets-Sheet 4

Inventor
Gustaf Larson
Attorney

Patented Oct. 27, 1931

1,828,869

UNITED STATES PATENT OFFICE

GUSTAF LARSON, OF HOLLYWOOD, CALIFORNIA, ASSIGNOR TO LOS ANGELES BRICK COMPANY, OF LOS ANGELES, CALIFORNIA, A CORPORATION OF CALIFORNIA

TILE-SHAPING AND TRIMMING MACHINE

Application filed December 22, 1930. Serial No. 503,932.

This invention relates to machines for forming and trimming one style of convex tile which approximates a semi-cylindrical shape, being, however, somewhat tapered or slightly frusto-conical in form to facilitate nesting and laying.

The object of the invention is to provide a machine which will simplify the trimming of such tapered or semi-frusto-conical tile, and preferably one wherein stationary trimming mechanism may be employed.

To accomplish this result tile receiving and forming blocks are so located on an endless conveyor that the longitudinal edges of the clay tiles on such blocks travel in a plane extending in the direction of travel. Thus, no complicated cam mechanism is required for actuation of trimming knives or the like, and these may be fixed in position. However, in order to form the desired tapered or similar tile, this trimmer arrangement requires the outermost portion of the forming face of each block to lie at an inclination to the line of travel and therefore requires shaping rollers or the like so mounted as to follow the contour of the various forming faces and movable at angles to the faces for insuring that the tile forming clay will conform thereto. This distinguishes from certain prior practices where the outer or uppermost portions of the forming faces were alined in the direction of travel and knives were required to be moved by cams in various paths out of line with the direction of travel, an expensive mechanical structure for imparting such motion being thereby unavoidable. Here the mounting and motion of the shapers is comparatively simple.

The invention, therefore, resides in the arrangement of a plurality of tapered forming blocks shaped somewhat in the form of half a frustum of a cone, pyramid or the like, so that the positions for the edges of the trimmed tiles will lie in a plane in the direction of travel, a preferably stationary knife being provided to trim each side of the tiles, the outermost portion of the forming faces being thus inclined to the direction of travel, and a series of shapers being provided to press the clay into conformity with such forming faces. Conveniently, the forming blocks are carried on an endless conveyor with their forming faces directed upward and their reverse faces down so that the clay as extruded from the die is laid upon said upwardly disposed forming faces as the conveyor advances. Since all portions of the forming faces of a frusto-conical or frusto-pyramidal block will be inclined to the direction of travel and to the axis of the blocks, a series of shaping rolls are employed, the various rollers moving at different inclinations to the forming blocks.

In the accompanying drawings wherein one embodiment of the invention is disclosed by way of illustration:

Fig. 1 is a side elevation of a tile forming machine constructed according to this improvement.

Fig. 2 is a plan view thereof.

Fig. 3 is an end elevation from line 3—3 of Fig. 1.

Figure 5:
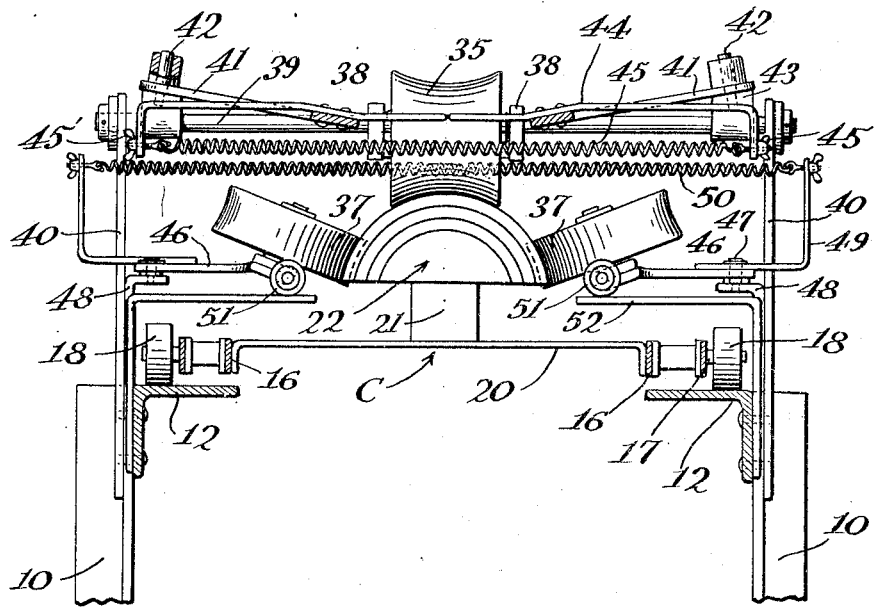
Figure 6:
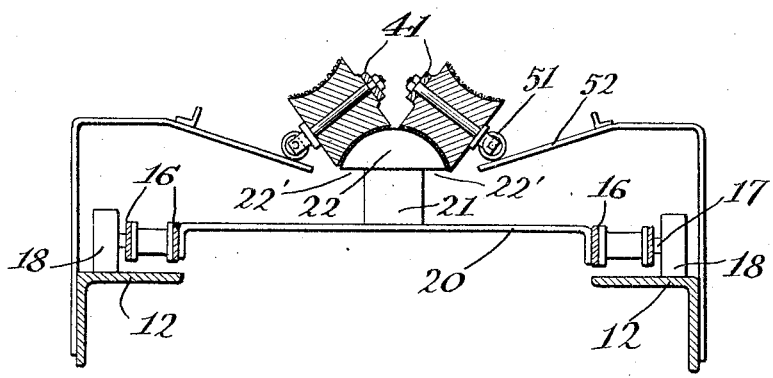

Figs. 4, 5 and 6 are cross sections taken respectively on the lines 4—4, 5—5, and 6—6 of Figs. 1 and 2.

Fig. 7 is a diagrammatic elevation indicating the relation of the tile forming clay to a series of the forming blocks on the conveyor.

Figs. 8 and 9 are cross sectional details taken on the lines 8—8 and 9—9 respectively of Fig. 7.

Fig. 10 is a perspective view of a trimmed and finished tile.

The operative parts of the machine are supported upon a plurality of standards 10 which carry at each side of the machine upper tracks 12 and lower tracks 13 for an endless conveyor —C—. At its opposite ends the machine is provided with sprocket wheels 14 carried on transverse shafts 14' journaled in adjustable bearings 15 mounted upon the standards. The endless conveyor —C—, which engages and travels upon the sprocket wheels 14, comprises at each side a series of links 16 pivoted on spindles 17 which carry rollers 18 in position to travel on the upper and lower tracks 12 and 13. Extending between the various links at the opposite sides of the conveyor is a corresponding number of transverse connecting and supporting bars 20 which are riveted or otherwise secured to the respective links (see Fig. 4). The middle portions of these bars 20 have secured thereto the supporting shanks 21 of an equivalent number of forming blocks 22 which are adapted to receive the tile forming material or clay designated at —M— in Figs. 7, 8 and 9.

The various blocks 22 are so mounted upon their supports 21 as to aline with one another and, when moving along the upper tracks 12, to constitute a continuous clay receiving form. As best shown in Fig. 4, the forming blocks are undercut at 22′ so as to somewhat overhang the inner ends of two stationary trimming knives —K— carried on brackets 24 fixed to the two opposite tracks 12. It will be noted that the undercut edges 22′ of the operative series of blocks 22 travelling along the tracks 12 are alined and are all disposed in a common horizontal plane extending in the direction of travel, thereby making it possible for the trimming knives —K— to uniformly trim away during conveyor movement the clay edges which hang below the under faces or edges of said forming blocks 22.

However, since the blocks 22 must be shaped so as to form a tapering tile, each such block must taper correspondingly. To accomplish this end each block of the form illustrated has the shape of a segment of the frustum of a cone. Since the tiles designated at —T— (see Fig. 10) are of considerable length, it is convenient to provide several forming blocks 22 for each tile so that each tile requires a series of blocks as indicated at 22a, 22b, 22c and 22d (Fig. 1), each block of a given series being successively larger or smaller than its neighbors and abutting therewith to form collectively a former or mold for a single tile. With this construction all portions of the forming faces of the blocks are inclined to the axes thereof and to the line or plane of travel. For convenience of laying and shaping the clay, adjacent series of blocks 22 representing adjacent full length tiles, are oppositely inclined or tapered in undulating fashion so that the clay layer when deposited is correspondingly disposed in an undulating layer as indicated in Fig. 7. In this fashion the overhanging or depending edges of the clay which are required to be trimmed off by the knives —K— are not uniform in width.

The conveyor —C— may be advanced by an appropriate means. That shown comprises a friction clutch 25 connected to drive the forward shaft 14′ of the forward sprocket wheels 14, this clutch being associated with a sprocket 26 driven by a chain 27 from a shaft 28 operated in any desired manner from a prime mover not shown. The clutch is adapted to slip when necessary to compensate for any lack of uniformity of the drive with the rate of feed of the tile forming clay as expressed from the feeding die. In connection with driving the conveyor, it is also convenient to provide the opposite end of said forward shaft 14′ with a gear wheel 29 meshing with a second gear wheel 30 which drives a skeleton drum or cage 31 in which are freely suspended transversely disposed yokes or frames 32 provided with severing wires 33 for severing adjacent tiles after forming and shaping thereof as later to be described.

Since the tile forming clay is extruded from its die in the shape of an elongated semi-cylinder, it is necessary to provide means for pressing it into engagement with the forming blocks and thereby positively shaping it in conformity with the contour of such blocks. This function is performed by a series of concave shaping rollers 35, 36 and 37 which are mounted on transverse axes set at varying angles with respect to one another and thereby causing the rollers to rotate in different planes and to press the clay toward the faces of the forming blocks from different angles.

Thus, with the undercut edges 22′ of the blocks 22 disposed in a horizontal plane, a single roller 35 works directly on top of the forming blocks 22, rising and falling as the various series of tapered formers pass thereunder; the rollers 36 are set to work on opposite sides of the tile at angles approximating 45 degrees from the vertical; and the rollers 37 are set well around at the opposite sides in positions approaching the horizontal. Thus, the various rollers work over the entire forming face of each forming block 22. Roller 35 which may operate solely by gravity as shown, is journaled between a pair of arms 38 mounted on a shaft 39 pivoted in uprights 40 extending above the frame work of the machine. Each shaping roller 36 is journaled on an arm 41 pivoted on a pin 42 carried by a bracket 43 mounted to swing on shaft 39. Since gravity is not necessarily adequate for proper functioning of these rollers 36, arms 44 secured to arms 41 are provided for the mounting of a tension spring 45 held as by means of wing nuts 45′. The shaping rollers 37 similarly are carried on arms 46 pivoted at 47 on brackets 48 which are fixed to the uprights 40, and arms 49 serve to carry a tensioning spring 50 to insure the necessary shaping pressure. To insure the working of the rollers 36 and 37 uniformly in their respective paths they may be provided with supporting rollers 51 which travel along fixed guides 52 carried by the rails 12 or other fixed portions of the machine.

In operation of the present machine, motion is imparted by the chain 27, clutch 25 and forward shaft 14′ through the corresponding sprocket wheels 14 to the conveyor —C—, which then travels around the sprockets 14, the rollers 18 of the lower stretch traveling on tracks 13 and the rollers 18 of the upper stretch travelling on the upper tracks 12.

Thus the forming blocks of the upper stretch are properly positioned to receive the tile forming clay as it is expressed from a forming die and fed to the forming blocks 22 which have been properly alined on the tracks 12 by reason of the travel of the conveyor forward of the rear sprocket wheel 14. It will be noted that, as the forming blocks travel around the sprocket wheel 14, they are separated, but when they arrive on the upper stretch on tracks 12 they are properly abutted to receive the clay. The clay as fed tends somewhat to accommodate itself to the undulating contour of the series of forming blocks 22, but absolute shaping is assured by the pressing effect of the variously and angularly disposed rollers 35, 36 and 37. This pressing and shaping operation causes the surplus edges of the clay to depend unevenly below the undercut edges 22' of said blocks (see Fig. 7) and in the path of the stationary trimming knives —K— which are situated beyond said shaping rollers so as to become operative only after the clay has been shaped to the forms. As the conveyor continues its travel, the waste depending clay edges are trimmed off in a straight line by said knives —K—. The trimmings are directed away from the forming blocks by suitable clearing fingers 60 disposed at opposite sides of the forward end of the machine, and guards 62 prevent the trimmings from working into the forward sprocket wheels 14. As the tile, now properly shaped and trimmed, reaches the forward end of the machine, it is cut into separate tiles by the action of the cutting wires 33 carried in the freely swinging frames 32 of the cage 31. The descent of these wires is timed by the gears 29 and 30, and as the descent into severing position commences guides 65 on the ends of the frames 32 enter a guide slot 66 in a plate 67. This serves to direct the cutting wires 33 exactly into a narrow slot which is left between the end blocks of adjacent tile forming series of blocks 22.

Continued rotation of the cage 31 causes withdrawal of the wires after the tiles have been severed, whereupon the tiles are ready to be delivered to any device (not shown) just before the blocks separate in their passage around the adjacent sprocket wheels on their way to return to clay receiving position.

From the foregoing it is clear, that the arrangement of the reverse faces or undercut edges of the forming blocks to lie in a common horizontal plane, makes possible the use of stationary knives for the purpose of trimming tapered tile. It is also clear that this arrangement and this result is accomplished by inclining the outermost edges or portions of the forming faces of the forming blocks with respect to the line or direction of travel, the proper shaping of the clay to the forming faces so positioned being accomplished by the expedient of using a comparatively simple and inexpensive roller system. Thus it is unnecessary to impart any rising and falling motion to the trimming mechanism when manufacturing tapered tile. In fact no motion whatever need be imparted to the trimmer, and the stationary knives shown can be and preferably are employed. It is to be understood that various modifications within the scope of the claims may be made by those skilled in the art without departing from the spirit of the invention, but the form herein illustrated is one desirable embodiment which I have emloyed successfully. Thus wires may be substituted for the blade type of knife —K— disclosed, and other arrangements and designs of forming blocks may be employed.

I claim:

1. A tile forming machine comprising a conveyor carrying a plurality of tile forming blocks undercut on their reverse sides, means to aline a series of said blocks, the outer forming faces of the blocks being inclined with respect to said reverse sides, the longitudinal undercut edges of said series of blocks lying in a common plane when said series is alined, and stationary knives at opposite sides of the alined blocks for trimming the longitudinal edges of the tiles carried on such blocks.

2. A tile forming machine comprising a conveyor carrying a plurality of tile forming blocks undercut on their reverse sides, means to aline a series of said blocks, the outer forming faces of the blocks being inclined with respect to said reverse sides, the longitudinal undercut edges of said series of blocks lying in a common plane when said series is alined, and trimming means at opposite sides of said blocks for trimming the longitudinal edges of the tiles in line with said undercut edges.

3. A machine for forming tapered convex tiles comprising a conveyor, a plurality of tile forming blocks carried in alinement on said conveyor, the reverse sides of said blocks being connected with the conveyor and the outermost portions of the forming faces of said blocks being inclined to the direction of travel of the blocks, and stationary trimming means at the sides of the blocks for trimming the longitudinal edges of tiles carried by the alined blocks.

4. A machine for forming tapered convex tile comprising a conveyor, a plurality of tile forming blocks carried in alinement on said conveyor, the reverse sides of said blocks being connected with the conveyor and the outermost portions of the forming faces of said blocks being inclined to the direction of travel of the blocks, and trimming means at the sides of said blocks for trimming the longitudinal edges of tiles carried by the blocks along lines parallel with the direction of travel of the blocks.

5. A machine for forming tapered convex tiles comprising a conveyor, a plurality of forming blocks carried in alinement on said conveyor, the outer forming faces of said blocks being inclined to the direction of travel, each block having edges for defining the longitudinal edges of the tiles, all of said edges being in a common plane extending in the direction of travel, trimming means for trimming the tiles along said edges, and means to sever the tiles transversely.

6. A machine for forming tapered convex tiles comprising a conveyor, a plurality of forming blocks carried in alinement on said conveyor, the outer forming faces of said blocks being inclined to the direction of travel, each block having edges for defining the longitudinal edges of the tiles, all of said edges being in a common plane extending in the direction of travel, and trimming means for trimming the tiles along said edges, said trimming means being stationary with respect to the forming blocks.

7. A tile forming machine comprising a conveyor carrying a plurality of tile forming blocks undercut on their reverse sides, means to aline a series of said blocks, the outer forming faces of the blocks being inclined with respect to said reverse sides, the longitudinal undercut edges of said series of blocks lying in a common plane when said series is alined, a series of shapers for pressing tile forming clay into engagement with all portions of the inclined faces of said alined blocks, and stationary knives at opposite sides of the alined blocks for trimming the longitudinal edges of the tiles carried on such blocks.

8. A tile forming machine comprising a conveyor carrying a plurality of tile forming blocks undercut on their reverse sides, means to aline a series of said blocks, the outer forming faces of the blocks being inclined with respect to said reverse sides, the longitudinal undercut edges of said series of blocks lying in a common plane when said series is alined, a series of shapers for pressing tile forming clay with the inclined faces of the blocks and trimming means at opposite sides of said blocks for trimming the longitudinal edges of the tiles in line with said undercut edges.

9. A machine for forming tapered convex tiles comprising a conveyor, a plurality of tile forming blocks carried in alinement on said conveyor, the reverse sides of said blocks being connected with the conveyor and the outermost portions of the forming faces of said blocks being inclined to the direction of travel of the blocks, a series of shapers for pressing the tile forming clay into engagement with the inclined faces of said blocks, and stationary trimming means at the sides of the blocks for trimming the longitudinal edges of tiles carried by the alined blocks.

10. A machine for forming tapered convex tiles comprising a conveyor, a plurality of tile forming blocks carried in alinement on said conveyor, the reverse sides of said blocks being connected with the conveyor and the outermost portions of the forming faces of said blocks being inclined to the direction of travel of the blocks, a series of shapers for pressing tile forming clay into engagement with inclined faces of said alined blocks, and trimming means at the sides of said blocks for trimming the longitudinal edges of tiles carried by the blocks along lines parallel with the direction of travel of the blocks.

11. A machine for forming tapered convex tiles comprising a conveyor, a plurality of forming blocks carried in alinement on said conveyor, the outer forming faces of said blocks being inclined to the direction of travel, each block having edges for defining the longitudinal edges of the tiles, all of said edges being in a common plane extending in the direction of travel, a series of shapers for pressing the tile forming clay into engagement with all the inclined faces of said alined blocks, and trimming means for trimming the tiles along said edges.

12. A machine for forming tapered convex tiles comprising a conveyor, a plurality of tile forming blocks carried in alinement on said conveyor, the outer forming faces of said blocks being inclined to the direction of travel, each block having edges for defining the longitudinal edges of the tiles, all of said edges being in a common plane extending in the direction of travel, a series of shapers for pressing the tile forming clay into engagement with the inclined faces of said alined blocks, and trimming means for trimming the tiles along said edges, said trimming means being stationary with respect to the forming blocks.

13. A tile forming machine comprising a conveyor carrying a plurality of tile forming blocks undercut on their reverse sides, means to aline a series of said blocks, the outer forming faces of the blocks being inclined with respect to said reverse sides, the longitudinal undercut edges of said series of blocks lying in a common plane when said series is alined, a series of shapers for pressing the tile forming clay into engagement with the blocks, the shapers being respectively mounted to move in planes at different angles to the tile forming blocks, and stationary knives at opposite sides of the alined blocks for trimming the longitudinal edges of the tiles carried on such blocks.

14. A machine for forming tapered convex tiles comprising a conveyor, a plurality of tile forming blocks carried in alinement on said conveyor, the reverse sides of said blocks being connected with the conveyor and the outermost portions of the forming faces of said blocks being inclined to the direction of travel of the blocks, a series of shapers for pressing the tile forming clay into engagement with the blocks, the shapers being respectively mounted to move in planes at different angles to the tile forming blocks, and stationary trimming means at the sides of the blocks for trimming the longitudinal edges of tiles carried by the alined blocks.

15. A machine for forming tapered convex tiles comprising a conveyor, a plurality of tile forming blocks carried in alinement on said conveyor, the reverse sides of said blocks being connected with the conveyor and the outermost portions of the forming faces of said blocks being inclined to the direction of travel of the blocks, a series of shapers for pressing the tile forming clay into engagement with the blocks, the shapers being respectively mounted to move in planes at different angles to the tile forming blocks, and trimming means at the sides of said blocks for trimming the longitudinal edges of tiles carried by the blocks along lines parallel with the direction of travel of the blocks.

16. A machine for forming tapered convex tiles comprising a conveyor, a plurality of forming blocks carried in alinement on said conveyor, the outer forming faces of said blocks being inclined to the direction of travel, each block having edges for defining the longitudinal edges of the tiles, all of said edges being in a common plane extending in the direction of travel, and a series of shapers for pressing the tile forming clay into engagement with the blocks, the shapers being respectively mounted to move in planes at different angles to the tile forming blocks, and trimming means for trimming the tiles along said edges.

17. A tile forming machine comprising a conveyor carrying a plurality of tile forming blocks undercut on their reverse sides, means to aline a series of said blocks, the outer forming faces of the blocks being inclined with respect to said reverse sides, the longitudinal undercut edges of said series of blocks lying in a common plane when said series is alined, a plurality of shapers to press tile forming clay into engagement with the blocks, various shapers being mounted to move respectively at varying angles to the tile forming blocks, means to guide said shapers in their respective paths, and stationary knives at opposite sides of the alined blocks for trimming the longitudinal edges of the tiles carried on such blocks.

18. A machine for forming tapered convex tiles comprising a conveyor, a plurality of tile forming blocks carried in alinement on said conveyor, the reverse sides of said blocks being connected with the conyeyor and the outermost portions of the forming faces of said blocks being inclined to the direction of travel of the blocks, a plurality of shapers adapted to press tile forming clay into engagement with the blocks, various shapers being mounted to move respectively at varying angles to the tile forming blocks, means to guide said shapers in their respective paths, and trimming means at the sides of said blocks for trimming the longitudinal edges of tiles carried by the blocks along lines parallel with the direction of travel of the blocks.

19. A tile forming machine comprising an endless conveyor, a plurality of alined tile forming blocks attached to said conveyor, a series of said blocks for forming a single tile, the forming faces of said blocks inclining longitudinally, each series inclining in opposite directions to each other, means disposed adjacent the longitudinal edges of said blocks for trimming the longitudinal edges of the tiles, and means to sever the tiles transversely between each series.

20. An apparatus for forming tapered convex tile comprising a conveyor, a plurality of alined tile forming blocks attached to the conveyor, a group of forming blocks for forming a single tile, the tile forming faces of each group of blocks inclining longitudinally in directions opposite to each other, means to transversely sever the tiles between groups of blocks after the same are formed, and means to trim the longitudinal edges of the tiles.

21. A tile forming machine comprising an endless conveyor, a plurality of tile forming blocks attached thereto in alined relation, said blocks being substantially semi-circular in cross section and their upper tile forming surface presenting an undulating contour when in alined relation, the blocks on their attached surface being undercut on their side edges, the undercut edges lying in a common plane when the blocks are alined in a common plane when the blocks are alined, means to trim the side edges of the tile as the same are carried along the conveyor, and means to sever the tiles into predetermined lengths after the same are formed.

In tesitmony whereof I affix my signature.
GUSTAF LARSON.